United States Patent
Felstaine et al.

(10) Patent No.: US 9,760,923 B1
(45) Date of Patent: Sep. 12, 2017

(54) SYSTEM, METHOD, AND COMPUTER PROGRAM FOR SERVICE DESIGN AND CREATION

(71) Applicant: Amdocs Software Systems Limited, Dublin (IE)

(72) Inventors: Eyal Felstaine, Hertzeliya (IL); Ofer Hermoni, Yavne (IL); Guy Levi, Raananna (IL); Stephen John Plain, Bath (GB)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 131 days.

(21) Appl. No.: 14/673,587

(22) Filed: Mar. 30, 2015

Related U.S. Application Data

(60) Provisional application No. 62/020,939, filed on Jul. 3, 2014, provisional application No. 62/013,997, filed on Jun. 18, 2014.

(51) Int. Cl.
*G06Q 10/00* (2012.01)
*G06Q 30/06* (2012.01)
*G06F 17/30* (2006.01)

(52) U.S. Cl.
CPC ................... *G06Q 30/0603* (2013.01)

(58) Field of Classification Search
USPC .......................................... 705/28
See application file for complete search history.

(56) References Cited

U.S. PATENT DOCUMENTS

| | | | | |
|---|---|---|---|---|
| 2004/0143811 A1* | 7/2004 | Kaelicke | ............... | G06Q 10/10 717/101 |
| 2009/0193433 A1* | 7/2009 | Maes | ............... | G06Q 10/06 719/315 |
| 2011/0145278 A1* | 6/2011 | Maes | ............... | G06Q 10/06 707/769 |

* cited by examiner

*Primary Examiner* — Garcia Ade
(74) *Attorney, Agent, or Firm* — Zilka-Kotab, PC

(57) ABSTRACT

A system, method, and computer program product are provided for product/service design and creation. In use, at least one new resource is identified in a master catalog. The at least one resource is tested. Additionally, the at least one resource is released for service generation. Further, at least one service is generated utilizing the at least one resource. The at least one service is stored in the master catalog. In addition, the at least one service is released for product generation. Furthermore, at least one product is generated utilizing the at least one service. The at least one product is stored in the master catalog. Moreover, the at least one product is presented for sale.

6 Claims, 10 Drawing Sheets

SYSTEM, METHOD, AND COMPUTER PROGRAM FOR SERVICE DESIGN AND CREATION

CLAIM OF PRIORITY AND RELATED APPLICATIONS

This application claims the benefit of U.S. Provisional Application No. 62/013,997, filed Jun. 18, 2014, the entire contents of which are incorporated herein by reference. This application also claims the benefit of U.S. Provisional Application No. 62/020,939, filed Jul. 3, 2014, the entire contents of which are incorporated herein by reference.

FIELD OF THE INVENTION

The present invention relates to product and service design, and in particular to design while maintaining separation between product, service, and resource layers in a catalog.

BACKGROUND

In the context of product/service design and creation, a Product Manager typically has control over which products are presented to the market for sale and the revenue streams that may be established. Historically, this has been a process that was very problematic as this process was characterized by long lead times and high costs. This applies to products/services for both conventional networks and Network Function Virtualization based networks.

There is thus a need for addressing these and/or other issues associated with the prior art.

SUMMARY

A system, method, and computer program product are provided for product/service design and creation. In use, at least one new resource is identified in a master catalog. The at least one resource is tested. Additionally, the at least one resource is released for service generation. Further, at least one service is generated utilizing the at least one resource. The at least one service is stored in the master catalog. In addition, the at least one service is released for product generation. Furthermore, at least one product is generated utilizing the at least one service. The at least one product is stored in the master catalog. Moreover, the at least one product is presented for sale.

DETAILED DESCRIPTION

Figure 1:
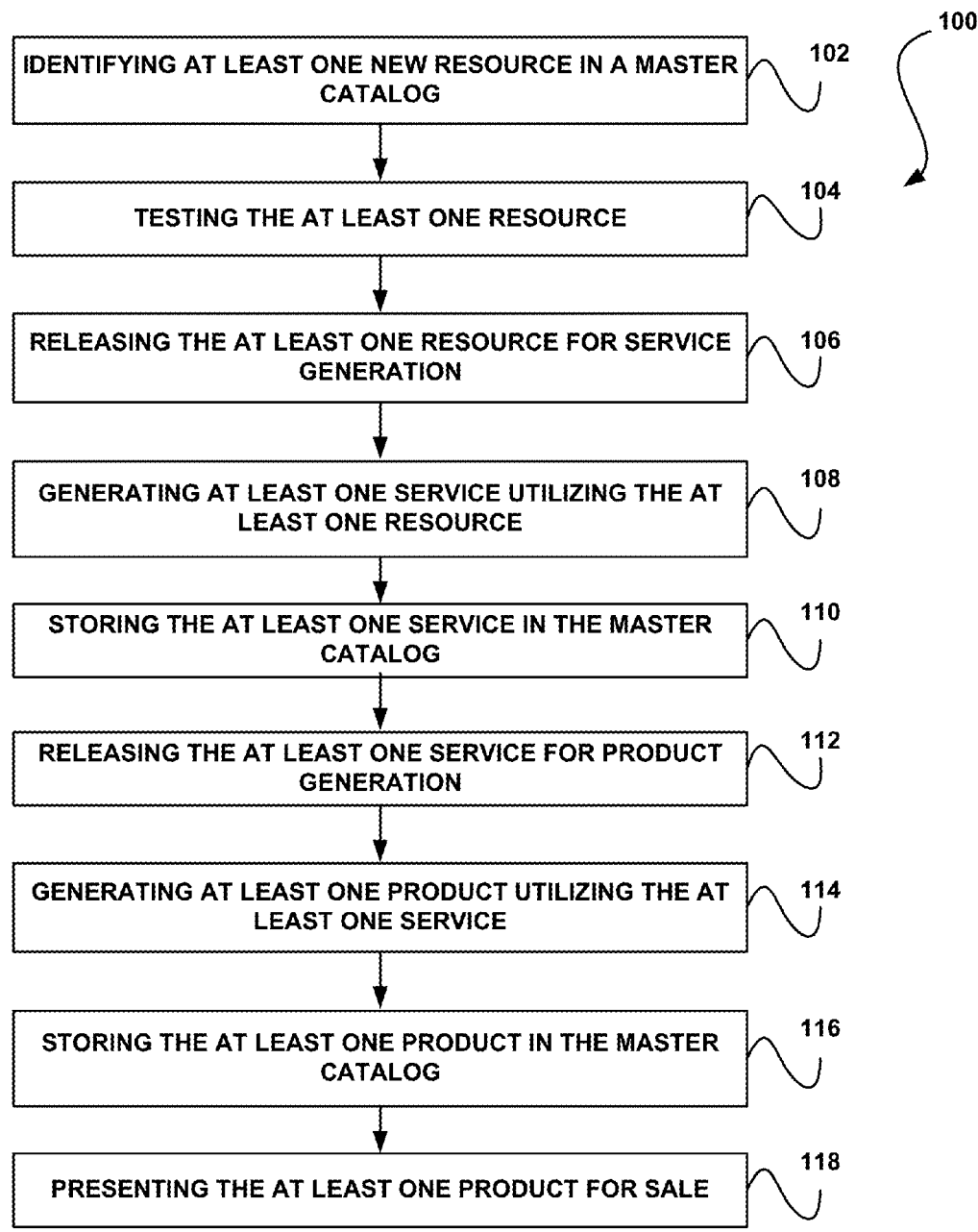
FIG. 1 illustrates a method for product/service design and creation, in accordance with one embodiment.

FIG. 1 illustrates a method 100 for product/service design and creation, in accordance with one embodiment.

As shown, at least one new resource is identified in a master catalog. See operation 102. The at least one resource is tested. See operation 104.

Additionally, the at least one resource is released for service generation. See operation 106. Further, at least one service is generated utilizing the at least one resource. See operation 108.

The at least one service is stored in the master catalog. See operation 110. In addition, the at least one service is released for product generation. See operation 112. Furthermore, at least one product is generated utilizing the at least one service. See operation 114.

The at least one product is stored in the master catalog. See operation 116. Moreover, the at least one product is presented for sale. See operation 118.

It should be noted that, although resources are on-boarded, they may or may not be utilized in the generation of services. The same goes for services. There use is optional. They will only be used if it is useful to do so.

Also, services may not always become products, as many services may be internal only. An example would be cell site backhaul that utilizes many services but they are never sold externally so will not have the attributes of a product.

In the context of the present description, a Product is built from Services or other Products and normally used to describe a commercial offering to customers. A Product can be used in any number (0, 1, or more) of other Products. The Product contains the commercial information needed to make a commercial offering with no technical or operationalization information about the Services from which it is built. Commercial information examples include: pricing, legal contract, SLA, Product eligibility rules, order capture requirements, and required/optional components. Example Products include: High Speed Broadband, network voice recorder, enterprise BVoIP, enterprise site-to-site connectivity, resilient VPN, etc.

A Service is built from Resources or other Services and normally used to build Products or other Services. A Service can be used in any number (0, 1, or more) of Products or Services. The Service contains no commercial description that a Product needs. The operational description contains all of the instructions and information needed to enable instantiation of the Service, potentially for a customer. Operational description examples include: scaling limits, fulfillment instructions, non-functional requirements, assurance behaviors, Resource options, usage measures, and high availability options. Example Services include: Broadband, managed internet, email, EPC, L2 VPN, VPN leg, security, voice recording, voice call, mobile base station backhaul, device location, e-line, and storage.

A Resource is a capability that can typically be used to build Services or other Resources. It can be dependent on other Resources so creating a composite Resource and can be used on any number (0, 1, or more) of Services. It is a base capability and contains no commercial description that a Product needs and no operationalization description that a Service needs. Resource examples include: email account, disk storage, compute, ADSL connectivity, VPN, HSS, firewall, a network API for location, and load balancer.

It should be noted that the method 100 applies for product/service design/creation for both conventional networks and Network Function Virtualization based networks.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
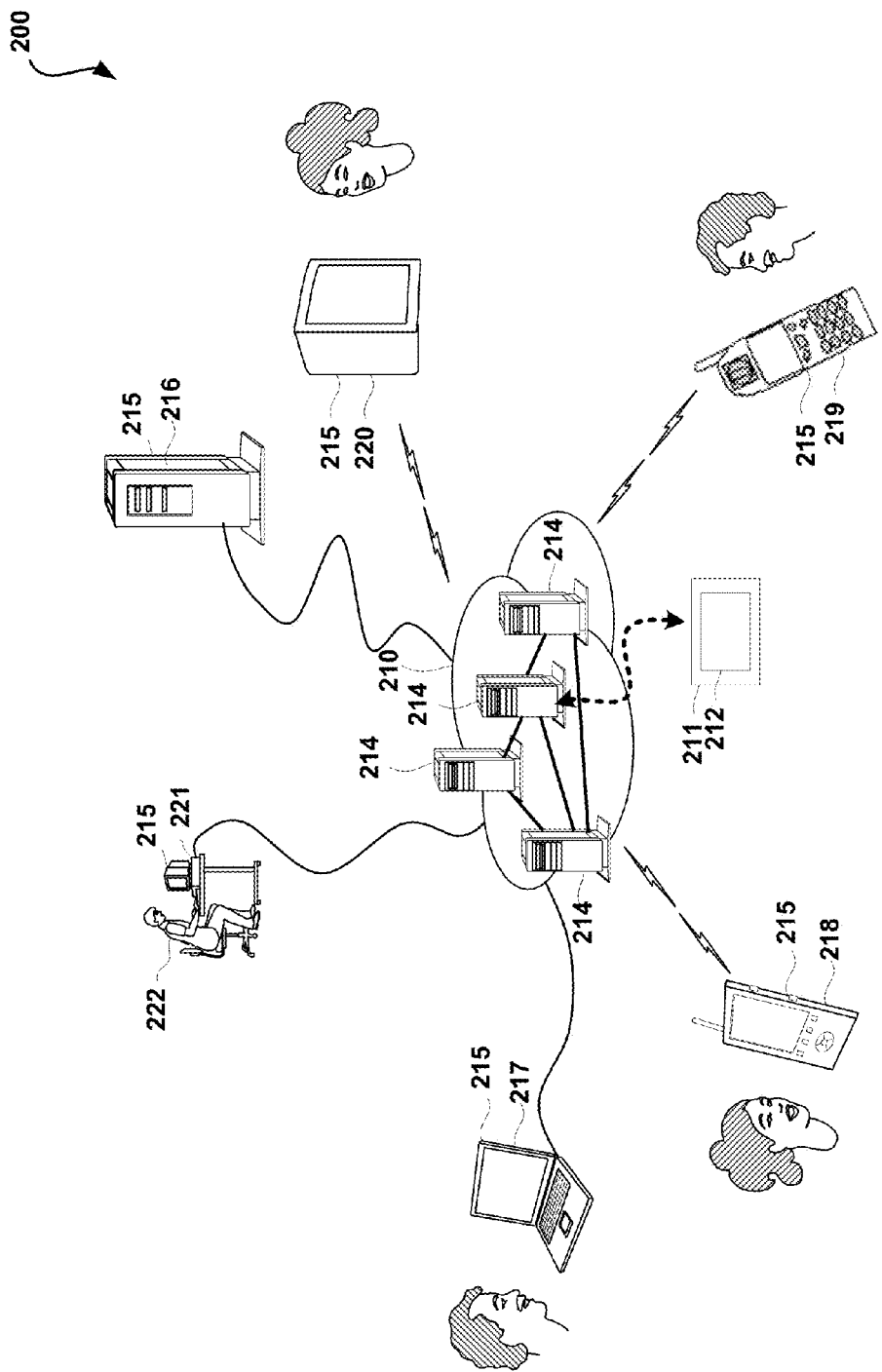
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, and an NFV-orchestration (NFV-O) module 212, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, and the NFV-O 212.

Figure 3:
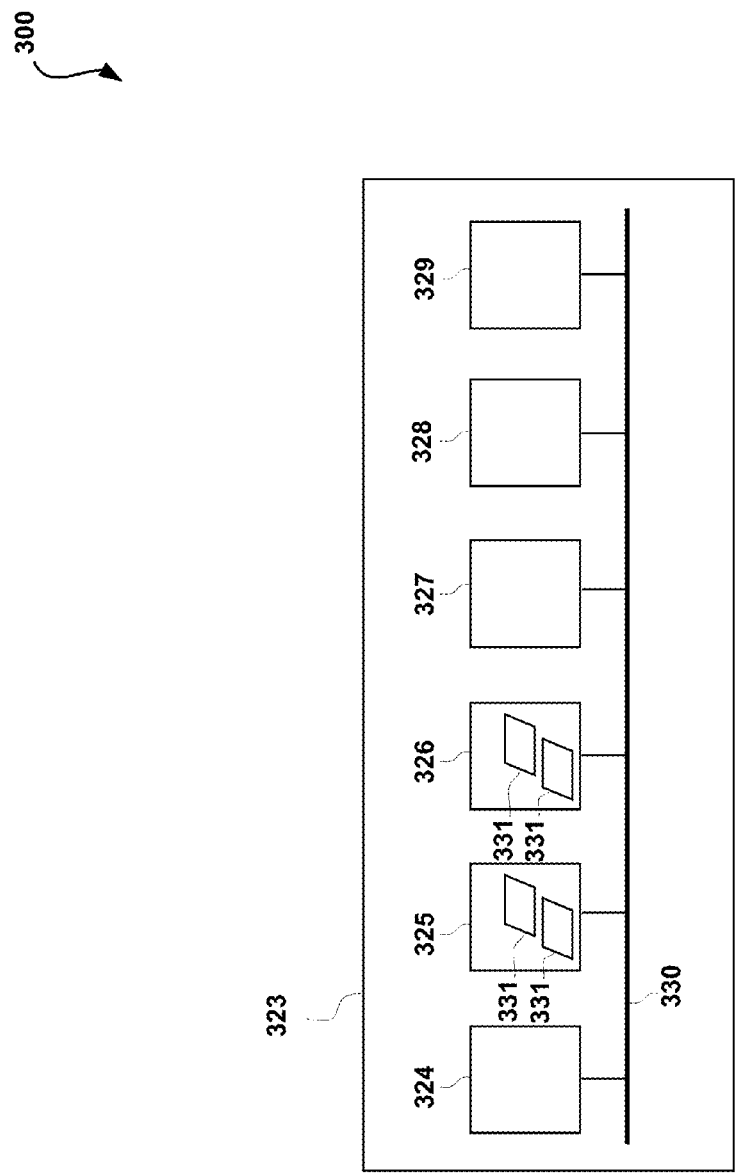
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, and the NFV-O 212 of FIG. 2.

Figure 4:
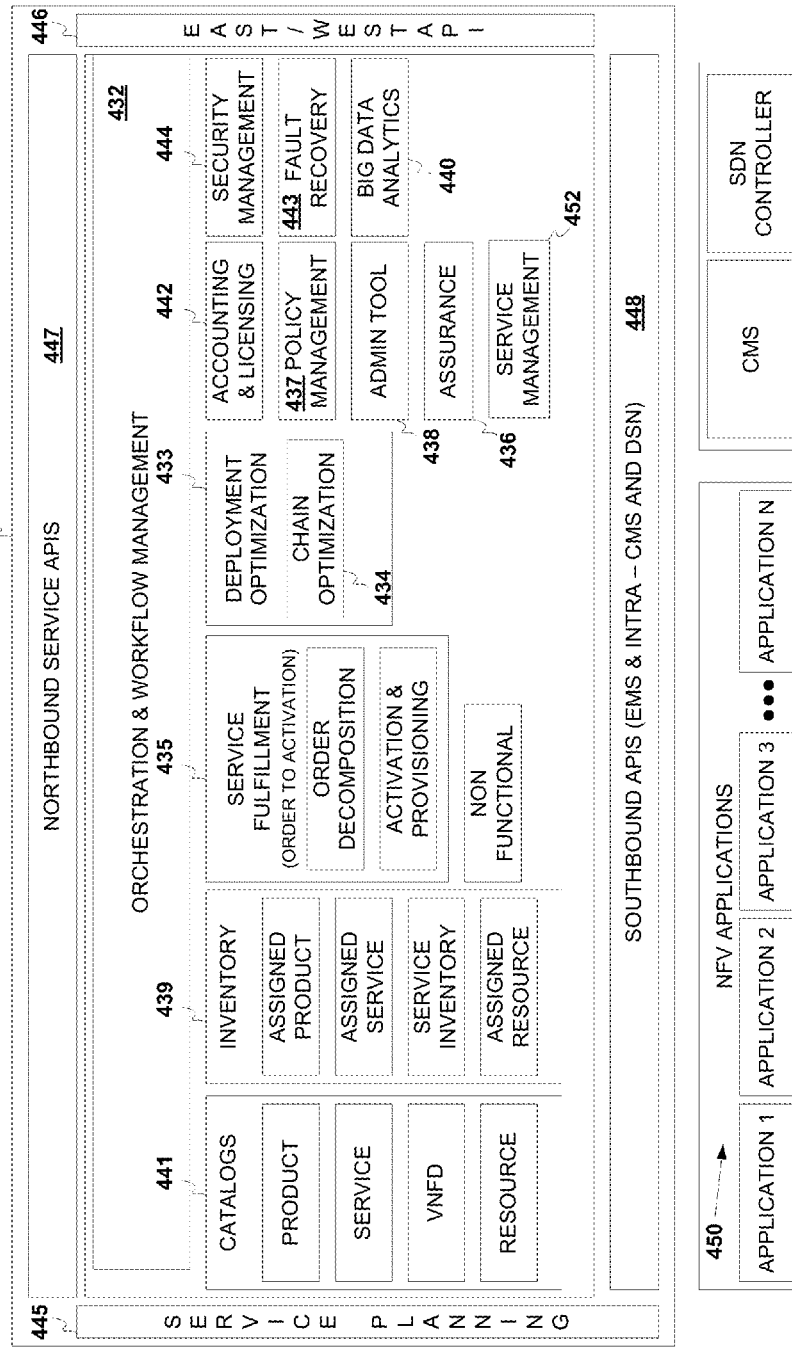
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
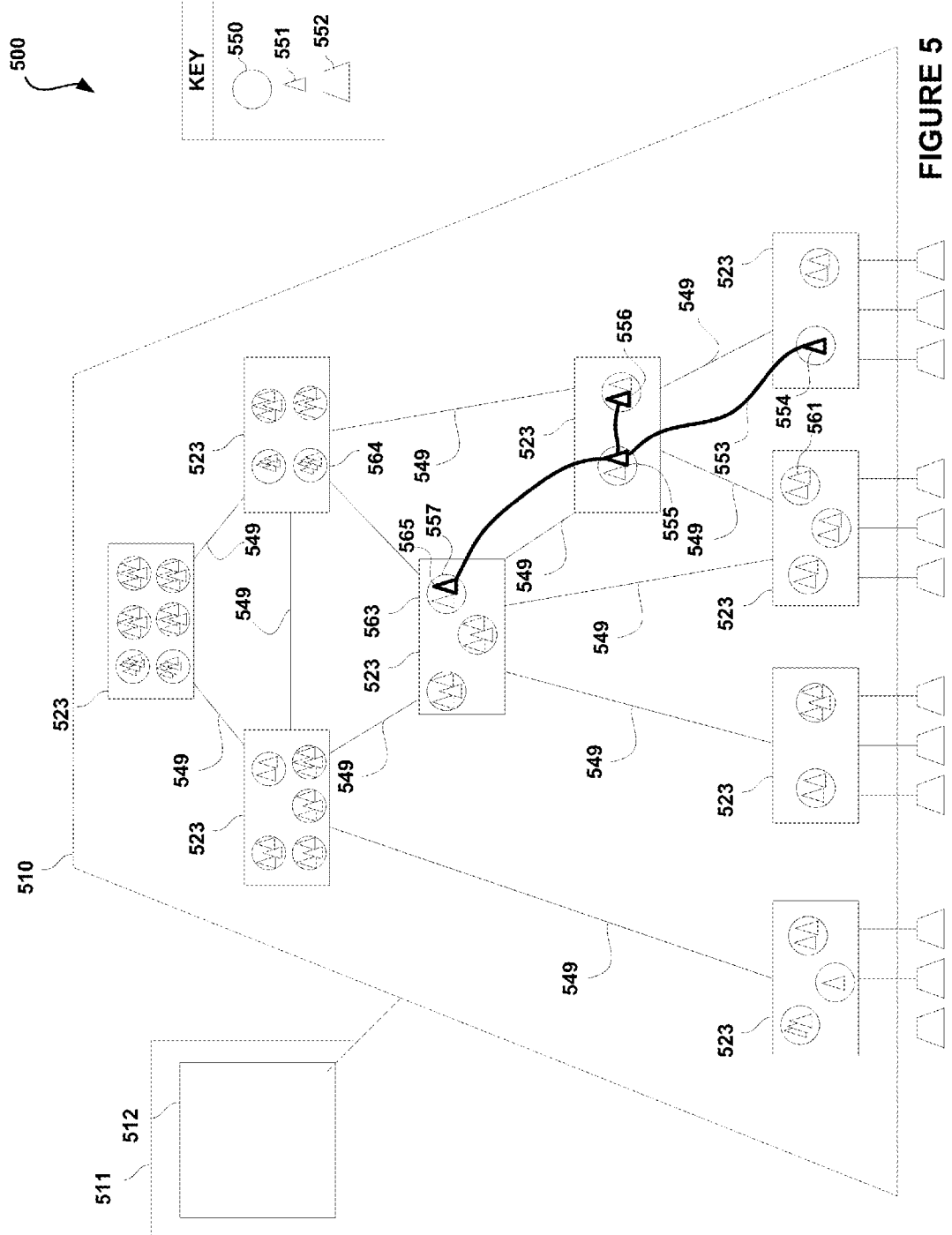
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, and an NFV-orchestration (NFV-O) 512.

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

With further reference to product/service design and creation, in one embodiment, product, services, and resources with their associated data, policies, and processes may be stored in a master catalog (e.g. associated with the catalog module 441 of FIG. 4, etc.). This catalog may support a number of critical business processes and may require tooling around it to enable the business. These tools include: onboarding tools for internal companies and third parties to onboard verify and approve virtual resources; designer tools to compose, test and launch network services; and product definition tools to define and launch products.

In this way, separation between product, service, and resource layers may be maintained. This is because they are typically carried out by different user communities and encourage modularity and thus reuse. Each community may be responsible for specific stages in the lifecycle of a catalog item. They will have formal processes and approvals before changes can be made and published to other communities. This is shown in FIG. 6, based on one example of identified job roles at a company.

Figure 6:
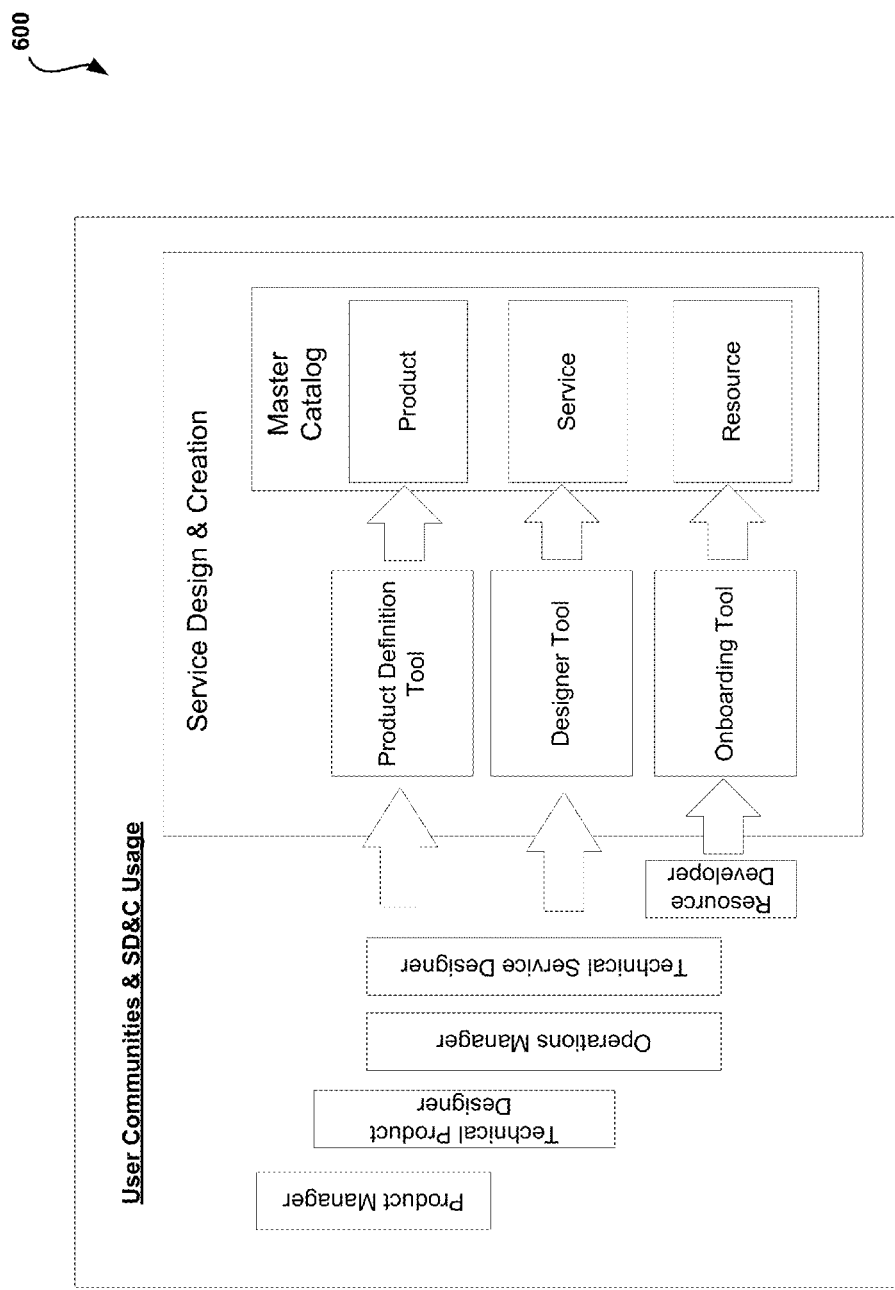
FIG. 6 illustrates a flow diagram for formal processes and approvals in the context of product and service creation, in accordance with one embodiment.

FIG. 6 illustrates a flow diagram 600 for formal processes and approvals in the context of product and service creation, in accordance with one embodiment. As an option, the flow diagram 600 may be implemented in the context of the details of the previous Figures. Of course, however, the flow diagram 600 may be implemented in the context of any desired environment. Further, the aforementioned definitions may equally apply to the description below.

The Product Manager is typically the role with control over which products are presented to the market for sale and from which to establish revenue streams. Historically this has been a process that was very problematic, characterized by long lead times and high costs.

In one embodiment, virtualization plus sophisticated management tooling may be utilized to transform this slow process to one of a drag and drop exercise. In this new environment a Product Manager will be able to rapidly combine existing services into new products and to create variations of products quickly, simply and reliably, which may be tested and available for launch.

These rapidly created products can then be market tested at low cost to the business to determine which specific products are attractive in the market. Not only can the service components be varied for each product variant (using the catalog tools), but also, for example, the customer eligibility rules and the pricing plan can be varied. This approach is simply not possible with the existing approach to managing products.

The process of designing products and services is best illustrated by an example in which the design process has been considered from the bottom up (resources into services into products). In another embodiment, one could start from any place in the catalog and expand from there. A secure VPN product is presented as an example.

Figure 7:
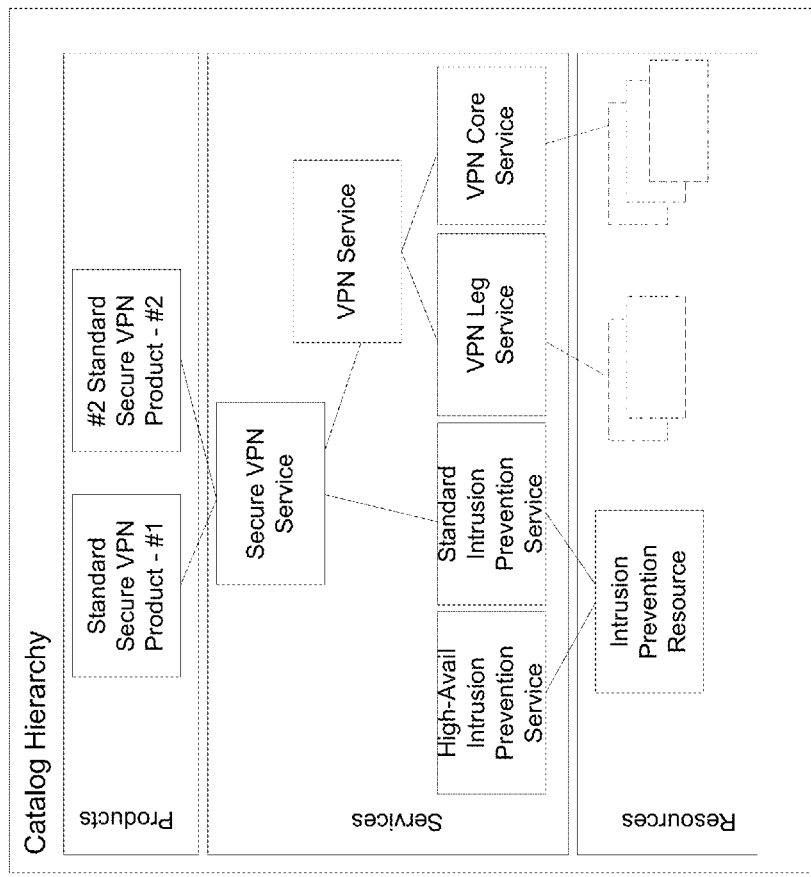
FIG. 7 illustrates one example of designing products and services, in accordance with one embodiment.

FIG. 7 illustrates one example 700 of designing products and services, in accordance with one embodiment. As an option, the example 700 may be implemented in the context of the details of the previous figures. Of course, however, the example 700 may be implemented in the context of any desired environment. Further, the aforementioned definitions may equally apply to the description below.

In this example there is a new Intrusion Prevention Function that has become available in the equipment market. It is available as a VNF and the supplier is already on-boarded to the SD&C environment. The first step is for the Resource Developer from the supplier to use the onboarding tools to capture details about and test the Intrusion Prevention VNF in the Resource catalog. This includes such things as the processes to manage the VNF, such as start, update, scale and cease, and policies for such things as needed resources, when to scale, how to respond to errors, configurations, and dependencies on other resources.

Figure 8:
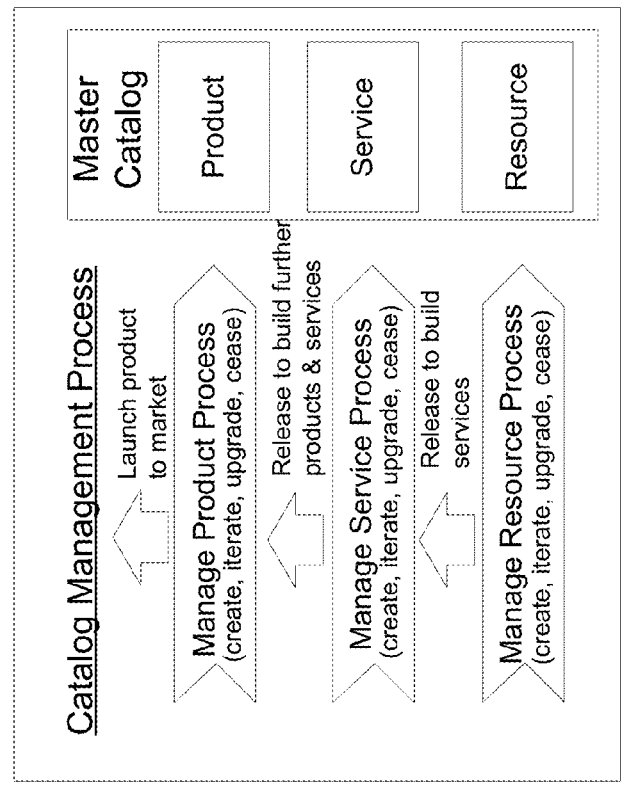
FIG. 8 shows an overview of a catalog management process, in accordance with one embodiment.

At this point the Intrusion Prevention Resource is not available to any other user community. When ready, the Resource Developer may request that the Intrusion Prevention VNF be approved for use in the operational network. The Operations Manager and Technical Service Designer would ensure that the appropriate verification and validation tests (e.g. using SD&C tooling) have been completed to ensure it is "safe" for use by Services, and if so approved it will be made generally available (GA). FIG. 8 shows an overview of the catalog management process 800, in accordance with one embodiment.

With the Intrusion Prevention Resource generally available, the Technical Service Designer can now build one or more Services out of it, for example, standard and high availability options. In this case the Technical Service Designer is initially creating the Standard Intrusion Prevention Service.

The designer will define the processes and policies needed to manage the service, for example, the maximum bandwidth the service can handle, the process to instantiate it, and whether it is an internal resource facing service or one that is customer facing and can be directly combined into a Product for sale. Once again, the Technical Service Designer would need to get approval before the new service can be published and made generally available.

In this case the Technical Service Designer has decided to combine the new Standard Intrusion Prevention Service with an existing VPN Service to produce the new Secure VPN Service. This new service is created in the catalog and references are made to the already existing two sub-services.

Further processes and policies are added to Secure VPN Service to address such things as the order in which the sub-services must be instantiated, service configuration, attributes required for instantiation, prerequisites, and compatibility with other services. The system will also validate the compatibility of the Standard Intrusion Prevention Service with the VPN Service to ensure, among other things, there is interoperability and that no policies have been breached.

These robust service definitions and validations ensure that only "well behaved" services are made available for instantiation into the network. Once again, the service can only be used to build other services or products once it has been approved and made generally available; likely by the Technical Product Designer, the Operations Manager, and the Senior Technical Services Designer.

At this point there is a new Secure VPN Service that can be safely instantiated in the network but it has not been made available in the market. The Product Manager and the Technical Product Designer now use the Product Definition Tool to define the new Secure VPN Product. The product definition references the service of the same name and adds an additional set of processes and policies. These address such areas as price plans, order capture process, product eligibility (e.g., markets and customer types), and upgrades from previous product versions.

Once approved by the Product Manager the new Secure VPN Product can be made generally available. At this point the service would automatically be made available in the customer ordering system where eligible customers will be able to select, order, and be provisioned for it.

Figure 9:
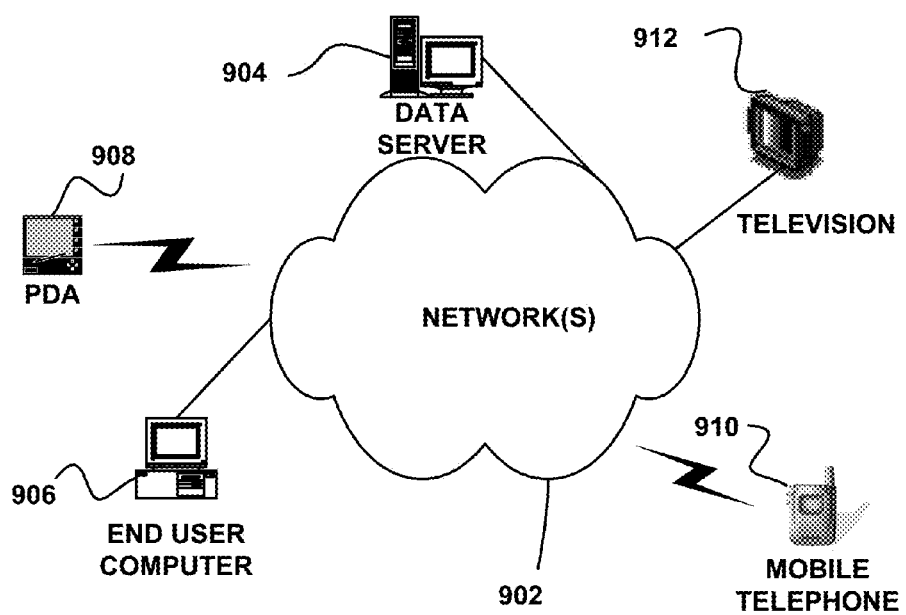
FIG. 9 illustrates a network architecture, in accordance with one possible embodiment.
Figure 9:

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
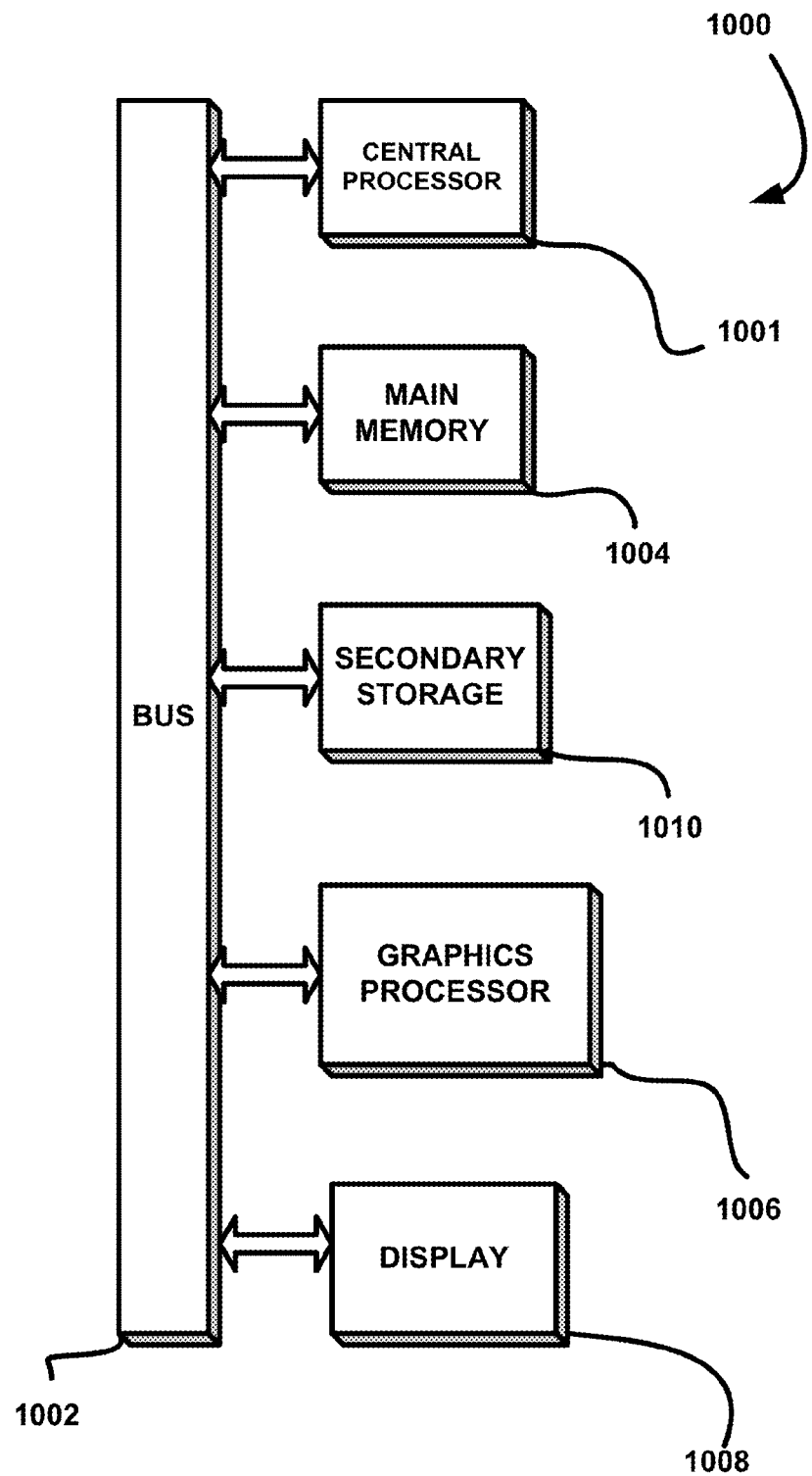
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a virtual network function (VNF) newly stored in a master catalog of a network function virtualization (NFV) management hardware system within a network function virtualization (NFV)-based network, the VNF being a software program implementation of a function within the NFV-based network;
   receiving, through tools of a product design and creation environment of the NFV management hardware system, details about the VNF, including:
      (a) processes to manage: start, update, scale and cease of the VNF, and
      (b) policies for: needed resources, when to scale, how to respond to errors, configurations, and dependencies on other resources;
   testing, through the tools of the product design and creation environment of the NFV management hardware system, the VNF;
   receiving, through the NFV management hardware system, a request that the VNF be approved for use in the NFV-based network;
   responsive to the request and upon ensuring that verification and validation tests have been completed for the VNF, releasing, through the tools of the product design and creation environment of the NFV management hardware system, the VNF for service generation;
   generating, through the tools of the product design and creation environment of the NFV management hardware system, a first service from the VNF;
   storing, by the product design and creation environment of the NFV management hardware system, the first service in the master catalog;
   making the first service accessible through the master catalog, by the product design and creation environment of the NFV management hardware system;
   combining, through the tools of the product design and creation environment of the NFV management hardware system, the first service with a second service existing in the master catalog to create a new third service in the master catalog with references being made to the first service and the second service;
   adding to the third service, through the tools of the product design and creation environment of the NFV management hardware system, processes and policies to address:
      an order in which the first service and the second service must be instantiated, service configuration, attributes required for instantiation, prerequisites, and compatibility with other services;
   validating, through the tools of the product design and creation environment of the NFV management hardware system, the compatibility of the first service with the second service to ensure there is interoperability and that no policies have been breached;

responsive to the validation, making the third service available for instantiation in the NFV-based network;

receiving, through the tools of the product design and creation environment of the NFV management hardware system, a new definition of a product that references the third service and that adds an additional set of processes and policies which address;

price plans, order capture process, product eligibility for markets and customer types, and upgrades from previous product versions;

automatically making the product available in a customer ordering system of the NFV management hardware system for selection, ordering, and provisioning of the product by customers of the NFV-based network.

2. The method of claim 1, wherein separation between product, service, and resource layers is maintained in the master catalog.

3. A computer program product embodied on a non-transitory computer readable medium and including computer code executable by a processor to perform a method comprising:

identifying a virtual network function (VNF) newly stored in a master catalog of a network function virtualization (NFV) management hardware system within a network function virtualization (NFV)-based network, the VNF being a software program implementation of a function within the NFV-based network;

receiving, through tools of a product design and creation environment of the NFV management hardware system, details about the VNF, including:

(a) processes to manage: start, update, scale and cease of the VNF, and (b) policies for: needed resources, when to scale, how to respond to errors, configurations, and dependencies on other resources;

testing, through the tools of the product design and creation environment of the NFV management hardware system, the VNF;

receiving, through the NFV management hardware system, a request that the VNF be approved for use in the NFV-based network;

responsive to the request and upon ensuring that verification and validation tests have been completed for the VNF, releasing, through the tools of the product design and creation environment of the NFV management hardware system, the VNF for service generation;

generating, through the tools of the product design and creation environment of the NFV management hardware system, a first service from the VNF;

storing, by the product design and creation environment of the NFV management hardware system, the first service in the master catalog;

making the first service accessible through the master catalog, by the product design and creation environment of the NFV management hardware system;

combining, through the tools of the product design and creation environment of the NFV management hardware system, the first service with a second service existing in the master catalog to create a new third service in the master catalog with references being made to the first service and the second service;

adding to the third service, through the tools of the product design and creation environment of the NFV management hardware system, processes and policies to address:

an order in which the first service and the second service must be instantiated, service configuration, attributes required for instantiation, prerequisites, and compatibility with other services;

validating, through the tools of the product design and creation environment of the NFV management hardware system, the compatibility of the first service with the second service to ensure there is interoperability and that no policies have been breached;

responsive to the validation, making the third service available for instantiation in the NFV-based network;

receiving, through the tools of the product design and creation environment of the NFV management hardware system, a new definition of a product that references the third service and that adds an additional set of processes and policies which address:

price plans, order capture process, product eligibility for markets and customer types, and upgrades from previous product versions;

automatically making the product available in a customer ordering system of the NFV management hardware system for selection, ordering, and provisioning of the product by customers of the NFV-based network.

4. The computer program product of claim 3, wherein the computer program product is operable such that separation between product, service, and resource layers is maintained in the master catalog.

5. A system comprising:

a memory system storing a master catalog; and one or more processing cores of a network function virtualization (NFV) management hardware system that are coupled to the memory system and that are each configured to:

identify a virtual network function (VNF) newly stored in the master catalog of the NFV management hardware system within a network function virtualization (NFV)-based network, the VNF being a software program implementation of a function within the NFV-based network;

receive, through tools of a product design and creation environment of the NFV management hardware system, details about the VNF, including:

(a) processes to manage: start, update, scale and cease of the VNF, and (b) policies for: needed resources, when to scale, how to respond to errors, configurations, and dependencies on other resources;

test, through the tools of the product design and creation environment of the NFV management hardware system, the VNF;

receive, through the NFV management hardware system, a request that the VNF be approved for use in the NFV-based network;

responsive to the request and upon ensuring that verification and validation tests have been completed for the VNF, release, through the tools of the product design and creation environment of the NFV management hardware system, the VNF for service generation;

generate, through the tools of the product design and creation environment of the NFV management hardware system, a first service from the VNF;

store, by the product design and creation environment of the NFV management hardware system, the first service in the master catalog;

make the first service accessible through the master catalog, by the product design and creation environment of the NFV management hardware system;

combine, through the tools of the product design and creation environment of the NFV management hardware system, the first service with a second service existing in the master catalog to create a new third service in the master catalog with references being made to the first service and the second service;

add to the third service, through the tools of the product design and creation environment of the NFV management hardware system, processes and policies to address:
   an order in which the first service and the second service must be instantiated, service configuration, attributes required for instantiation, prerequisites, and compatibility with other services;

validate, through the tools of the product design and creation environment of the NFV management hardware system, the compatibility of the first service with the second service to ensure there is interoperability and that no policies have been breached;

responsive to the validation, make the third service available for instantiation in the NFV-based network;

receive, through the tools of the product design and creation environment of the NFV management hardware system, a new definition of a product that references the third service and that adds an additional set of processes and policies which address:
   price plans, order capture process, product eligibility for markets and customer types, and upgrades from previous product versions;

automatically make the product available in a customer ordering system of the NFV management hardware system for selection, ordering, and provisioning of the product by customers of the NFV-based network.

6. The system of claim 5, wherein the system is operable such that separation between product, service, and resource layers is maintained in the master catalog.

* * * * *